US009276666B1

(12) United States Patent
Rai et al.

(10) Patent No.: US 9,276,666 B1
(45) Date of Patent: Mar. 1, 2016

(54) METHODS AND SYSTEMS FOR SUPPRESSING TUNE AWAY OF MOBILE STATIONS

(71) Applicant: Sprint Spectrum L.P., Overland Park, KS (US)

(72) Inventors: Deveshkumar Rai, Overland Park, KS (US); Saravana Velusamy, Olathe, KS (US); Suryanarayanan Ramamurthy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 93 days.

(21) Appl. No.: 13/947,756

(22) Filed: Jul. 22, 2013

(51) Int. Cl.
*H04W 36/00* (2009.01)
*H04B 7/216* (2006.01)

(52) U.S. Cl.
CPC ........... *H04B 7/216* (2013.01); *H04W 36/0022* (2013.01)

(58) Field of Classification Search
None
See application file for complete search history.

(56) References Cited

U.S. PATENT DOCUMENTS

| | | | |
|---|---|---|---|
| 2002/0082029 A1* | 6/2002 | Ahmad et al. | 455/458 |
| 2003/0225912 A1* | 12/2003 | Takeda et al. | 709/246 |
| 2004/0052265 A1* | 3/2004 | Mondal | 370/402 |
| 2006/0229074 A1* | 10/2006 | Semper | 455/436 |
| 2007/0155376 A1* | 7/2007 | Payyappilly et al. | 455/422.1 |
| 2007/0291792 A1* | 12/2007 | Watfa et al. | 370/469 |
| 2008/0188223 A1* | 8/2008 | Vesterinen et al. | 455/436 |
| 2009/0274122 A1* | 11/2009 | Wu | 370/331 |
| 2010/0226267 A1* | 9/2010 | Jang et al. | 370/252 |
| 2011/0014919 A1* | 1/2011 | Otte et al. | 455/442 |
| 2011/0077011 A1* | 3/2011 | Wang et al. | 455/445 |
| 2011/0096732 A1* | 4/2011 | Rashid et al. | 370/329 |
| 2011/0176512 A1* | 7/2011 | Sun | 370/331 |
| 2012/0064885 A1 | 3/2012 | Ramachandran et al. | |
| 2012/0281536 A1* | 11/2012 | Gell et al. | 370/235 |

* cited by examiner

*Primary Examiner* — Dung B Huynh

(57) ABSTRACT

A wireless-communication system includes a first network and a second network (e.g., an EV-DO network and a 1xRTT network, respectively). A wireless-communication-system entity determines that a mobile station is engaged in a first type of communication (e.g., a voice call) via the first network. In response to making the determination, the entity configures the second network to send second-network data (e.g., 1xRTT page messages) to the mobile station via an inter-network connection interface.

8 Claims, 5 Drawing Sheets

METHODS AND SYSTEMS FOR SUPPRESSING TUNE AWAY OF MOBILE STATIONS

BACKGROUND

Unless otherwise indicated herein, the materials described in this section are not prior art to the claims and are not admitted to be prior art by inclusion in this section.

A typical cellular wireless network may include a number of base stations that radiate to define wireless coverage areas, such as sectors and cells, in which mobile stations such as cell phones, tablet computers, tracking devices, embedded wireless modules, and other wirelessly-equipped communication devices can operate. In turn, each base station may be communicatively coupled to network infrastructure that provides connectivity to one or more transport networks such as the public switched telephone network (PSTN) and/or the Internet. With this arrangement, a mobile station within coverage of a wireless network may engage in air-interface communication with a base station and may thereby communicate via the base station with various remote network entities or with other mobile stations served by the base station.

In general, a cellular wireless network may operate in accordance with a particular air-interface protocol or "radio access technology," with communications from the base stations to mobile stations defining a downlink or forward link and communications from the mobile stations to the base stations defining an uplink or reverse link. Examples of existing air-interface protocols include Code Division Multiple Access (CDMA) protocols such as IS-95, 1xRTT, and Enhanced Voice-Data Only (EV-DO); Global System for Mobile Communications (GSM) protocols such as General Packet Radio Services (GPRS) and Enhanced Data rates for GSM Evolution (EDGE); Advanced Mobile Phone System (AMPS); Universal Mobile Telecommunications System (UMTS); Long-Term Evolution (LTE); Wi-Fi; and Bluetooth. Each protocol may define its own procedures for registration of mobile stations, initiation of communications, handoff between coverage areas, and functions related to air-interface communication.

In accordance with the air-interface protocol, each coverage area may operate on one or more carrier frequencies and may define a number of air-interface channels for carrying information between the base station and mobile stations. Each carrier represents a physical transmission interface, i.e., a frequency used to transmit data, while a logical channel is used to transmit data, organize transmitted data, and identify each data type (such as traffic, control, and broadcast data). Forward-link and reverse-link communication may occur on respectively different carriers.

Each coverage area may define a forward-link control channel (or "forward paging channel") used to transmit messages such as call setup procedures and registration instructions. Each carrier in a coverage area may include several forward paging channels, and each mobile station may be associated with at least one forward paging channel. The mobile-station forward-paging-channel assignments in a base station coverage area may be distributed over the available forward paging channels.

Mobile stations may be configured to periodically monitor their associated forward paging channel during an assigned time slot. The frequency at which a mobile station monitors its associated forward paging channel could vary, perhaps from once every few hundred milliseconds to once every several minutes.

Overview

A mobile station may operate according to multiple air-interface protocols. For example, a typical CDMA mobile station can operate according to both the EV-DO and 1xRTT protocols. EV-DO networks generally allow for only data (and not voice) communication (hence the name "Enhanced Voice-Data Only"); the forward paging channel of an EV-DO network thus will not typically carry voice-related page messages (such as incoming call notifications or short-message service messages). Accordingly, while engaged in a data communication session via an EV-DO network, the mobile station may periodically check for queued voice-related page messages on a 1xRTT or IS-95 network.

To check for queued voice-related page messages while engaged in a data communication session via an EV-DO network, the mobile station may "tune away" from the EV-DO network to the 1xRTT network. The tune away may involve the mobile station terminating an existing air-interface link with the EV-DO network and establishing a new air-interface link with the 1xRTT network. If there are no queued page messages, the mobile station may return to the EV-DO network and continue any existing data communication session.

While the mobile station is tuned away from the EV-DO network, data directed to the mobile station may be queued by the EV-DO network for delivery upon the mobile station re-establishing an air-interface link with the EV-DO network. As a result of the EV-DO network queuing the data, the actual delivery time of the data destined for the mobile station may be different (i.e., later) than the time of delivery expected by the sender and/or receiver of the data.

The unexpected delay in delivery of data over the EV-DO link may degrade the overall quality of the communication session. For example, voice communication is generally expected to be delivered constantly and instantly (or more precisely, with a delay imperceptible by either party to the voice call). For example, if an active voice communication session over the EV-DO link (e.g., a VoIP call) is delayed, the parties to the call may incorrectly perceive the conveyed voice communication. On the other hand, unexpected delays may have little or no impact on the quality of other types of communication sessions over the EV-DO link. For example, static webpage communication may be impacted minimally (if at all) by such delays given that webpage data (e.g., text and pictures) does not require real-time communication.

Described herein are various embodiments for preventing the delay of voice communication (or other types of communication) that would result from the mobile station tuning away from a network, among other objectives. In an embodiment, a wireless-communication system includes a first network and a second network (e.g., an EV-DO network and a 1xRTT network, respectively). A wireless-communication-system entity determines that a mobile station is engaged in a first type of communication (e.g., a voice call) via the first network. In response to making the determination, the entity configures the second network to send second-network data (e.g., 1xRTT page messages) to the mobile station via an inter-network connection interface (e.g., an IP Multimedia Subsystem (IMS)). The entity may also prevent the mobile station, for the duration of the communication session, from establishing an air-interface link with the second network.

By determining that a respective mobile station is engaged in a given type of communication over the first network link before the second network sends second-network data to the mobile station via the second network link, the need for a mobile station to tune away while engaged in certain types of communication over the first network link (e.g., voice calls) can be obviated.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended by way of example and not limitation.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

I. Exemplary Wireless-Communication System

Figure 1:
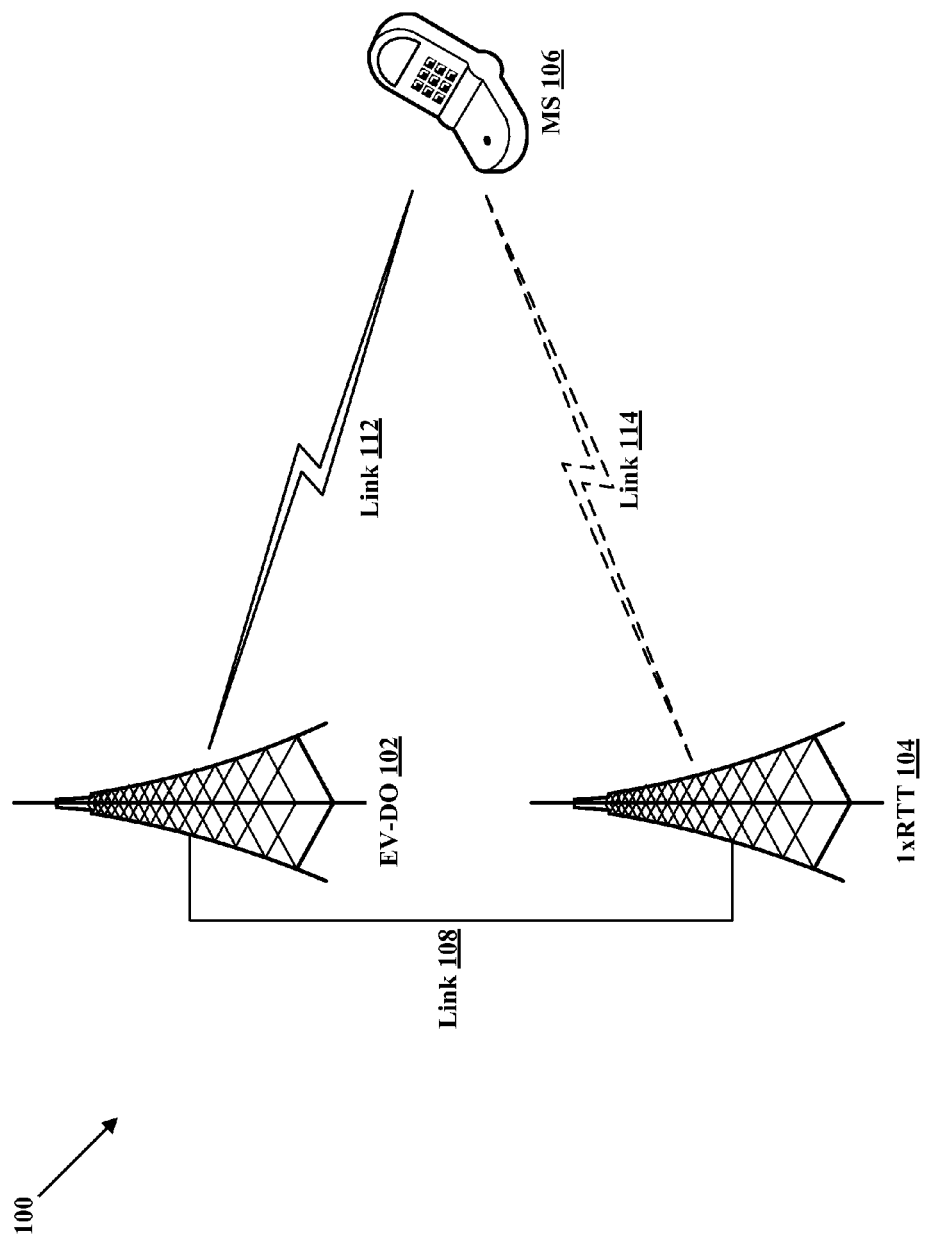
FIG. 1 is a simplified block diagram of a wireless-communication system in accordance with exemplary embodiments.

FIG. 1 is a simplified block diagram of a wireless-communication system, in accordance with exemplary embodiments. As shown in FIG. 1, wireless-communication system 100 includes a first network 102 and a second network 104, either or both of which may function to provide mobile stations with air-interface coverage and connectivity with one or more transport networks such as the PSTN and/or the Internet. Though FIG. 1 depicts networks 102 and 104 as an EV-DO network and a 1xRTT network, those having skill in the art will recognize that these networks may operate according to any other air-interface protocol without departing from the scope of the claims.

Networks 102 and 104 may each include one or more respective base stations, each radiating to provide respective coverage areas defining an air-interface through which to exchange control and bearer data with mobile stations. FIG. 1 depicts networks 102 and 104 as including a respective base station, though either or both networks could include multiple base stations, perhaps cooperatively defining one or more coverage areas.

As shown, networks 102 and 104 may be communicatively connected via link 108, which may facilitate exchange of signaling and other information between the networks. The base stations of each respective network may be in communication with back-end network infrastructure. By communicatively linking networks 102 and 104, registration and call setup signaling may be exchanged between the networks. Additionally or alternatively, networks 102 and 104 may be provided by the same base station, thus defining a coverage area providing service using two different air-interface protocols (e.g., EV-DO and 1xRTT). When in a respective coverage area of both networks 102 and 104, mobile station 106 may register with both networks.

In some example embodiments, first network 102 operates according to the EV-DO air-interface protocol, and second network 104 operates according to the 1xRTT protocol. EV-DO networks will generally carry only data communication, and will not carry voice communication unless encapsulated as data communication. Such encapsulation could take the form of, for example, Voice over Internet Protocol (VoIP) communication (including both Session Initiation Protocol (SIP) signaling and Real-time Transport Protocol (RTP) audio, as examples). 1xRTT networks, though typically providing lower communication throughput than EV-DO networks, generally allow for both data and voice communication.

EV-DO network 102 in wireless-communication system 100 is shown as including a representative base station known as an Access Node (AN), which includes an antenna structure and associated equipment for engaging in EV-DO communication with one or more Access Terminals (ATs) 106 over respective air-interface links 112. The AN, perhaps through a Packet Control Function (PCF), may facilitate communication with a packet-data network (such as the Internet) via a Packet Data Serving Node. 1xRTT network 104, on the other hand, is shown including a representative CDMA base station known as a base transceiver station (BTS), which includes an antenna structure and associated equipment for engaging in 1xRTT communication with mobile stations over respective air-interface links 114. The BTS (perhaps through a Base Station Controller (BSC)) may be in communication with a Mobile Switch Center (MSC) that functions to manage paging over the 1xRTT air-interface links and to provide connectivity with the PSTN. Note that mobile station 106 may be referred to as an access terminal in the context of an EV-DO network; however, the EV-DO access terminal and the 1xRTT mobile station may take the form of a single wireless-communication device configured to operate in accordance with both the EV-DO and 1xRTT air-interface protocols.

The solid line illustrating air-interface link 112 represents an established air-interface link, while the dotted link illustrating air-interface link 114 represents a possible, though not established, air-interface connection. Second network 104 may be configured to send to page messages or other communication to mobile station while an air-interface link is established between the mobile station and the second network. As another possibility, the second network may be configured to send page message to the mobile station via an air-interface link of a network other than the second network. For example, the second network may be configured to send communication to mobile station 106 via link 108 and air-interface link 112. It should be understood that the configuration of network 104 may change during performance of the various embodiments described herein, and that air-interface link 112 may be terminated and/or air-interface link 114 may be established.

II. Exemplary Operation

Figure 2:
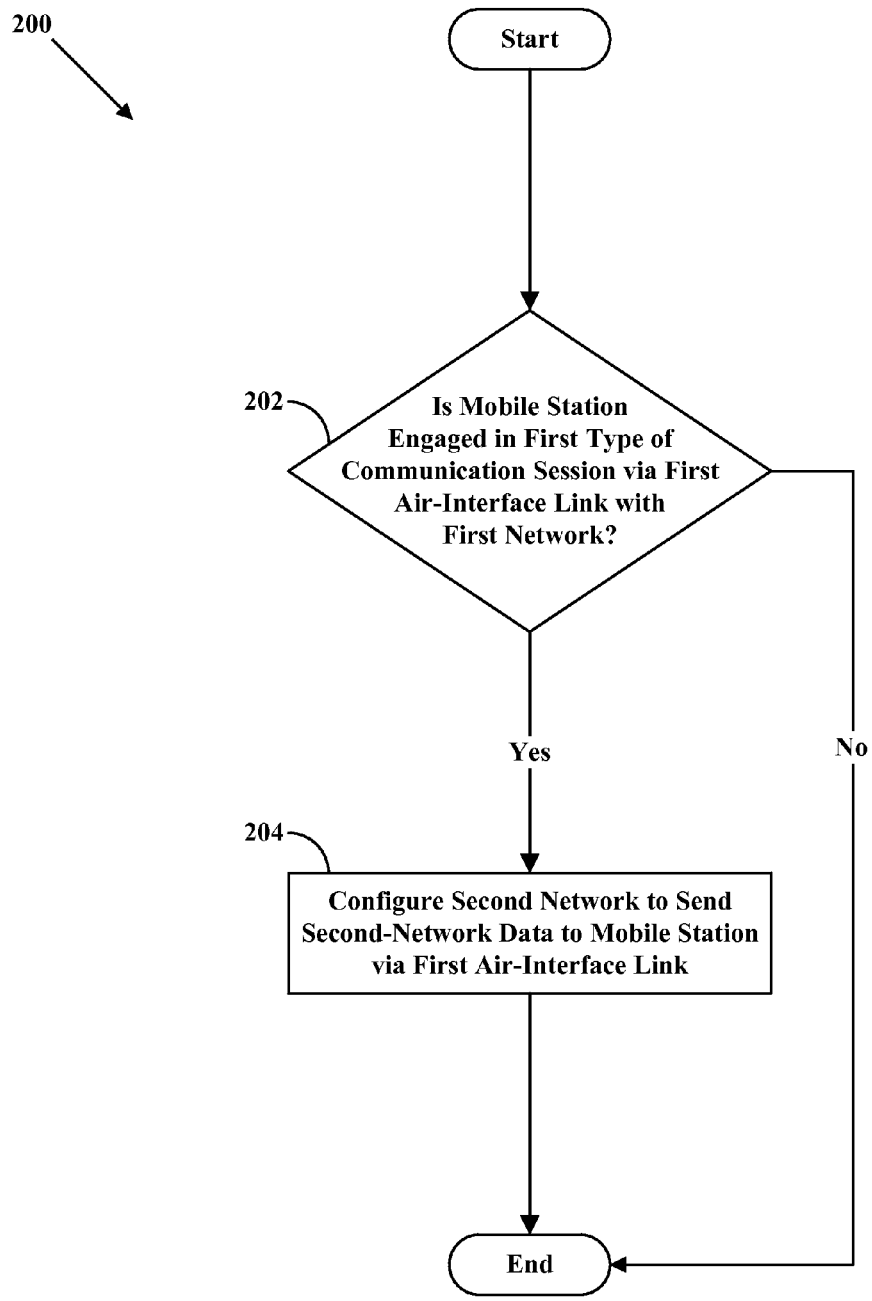
FIG. 2 is a flowchart of a method in accordance with exemplary embodiments.

FIG. 2 is a flowchart of a method, in accordance with exemplary embodiments. As shown in FIG. 2, method 200 begins at step 202 with first network 102 making a first determination that mobile station 106 is engaged in a first type of communication session via the first network. Though method 200 is described as being carried out by a first network, it should be understood that the method could be carried out by any entity in wireless-communication system 100, including mobile station 106 or any entity in networks 102 or 104 (such as a BTS or BSC), or any combination of these, as examples.

The first type of communication session could be a best-effort-delivery session such that first wireless network 102 will attempt to deliver data to the mobile station as fast as possible, but without guaranteeing that the data will be delivered within a given amount of time. As another possibility, the first type of communication session could be a guaranteed-bit-rate session such that the first wireless network guarantees that a given amount of data will be delivered to the mobile station in a given amount of time. Guaranteed-bit-rate sessions might be used for real-time communication such as voice or video communication sessions, which typically require low latency. On the other hand, best-effort communication sessions might be used for non-real-time communication such as text and picture communication sessions. It should be understood, however, that guaranteed-bit-rate and best-effort communication sessions can carry any type of communication, regardless of whether that communication is best suited for a real-time or non-real-time communication session.

Method 200 continues at step 204 with first network 102, in response to making the first determination, configuring second network 104 to send second-network data to mobile station 106 via an inter-network connection interface. The second-network data could include 1xRTT or IS-95 page messages, as examples.

The inter-network connection interface could include or take the form of an IMS or any other entity. The interface could comprise just one entity or perhaps multiple entities possibly acting in coordination with each other. The interface may communicatively link two or more networks (such as first network 102 and second network 104), perhaps with one or more entities interposed on the communication links between the networks. As a result of configuring second network 104 to send second-network data to mobile station 106 via the inter-network connection interface, second network 104 may send page messages to mobile station 106 via first network 102, rather than waiting to deliver the page messages until the mobile station establishes an air-interface link directly with second network 104. By so configuring second network 104, mobile station 106 does not need to terminate an air-interface link with first network 102 to check for page messages, thus permitting continuous delivery of communication-session data.

In response to making the first determination, first network 102 could also prevent mobile station 106, for the duration of the communication session, from establishing an air-interface link with second network 104. Those having skill in the art will recognize that other means of suppressing tune away of mobile station 106 are possible as well.

III. Second Exemplary Wireless-Communication System

Figure 3:
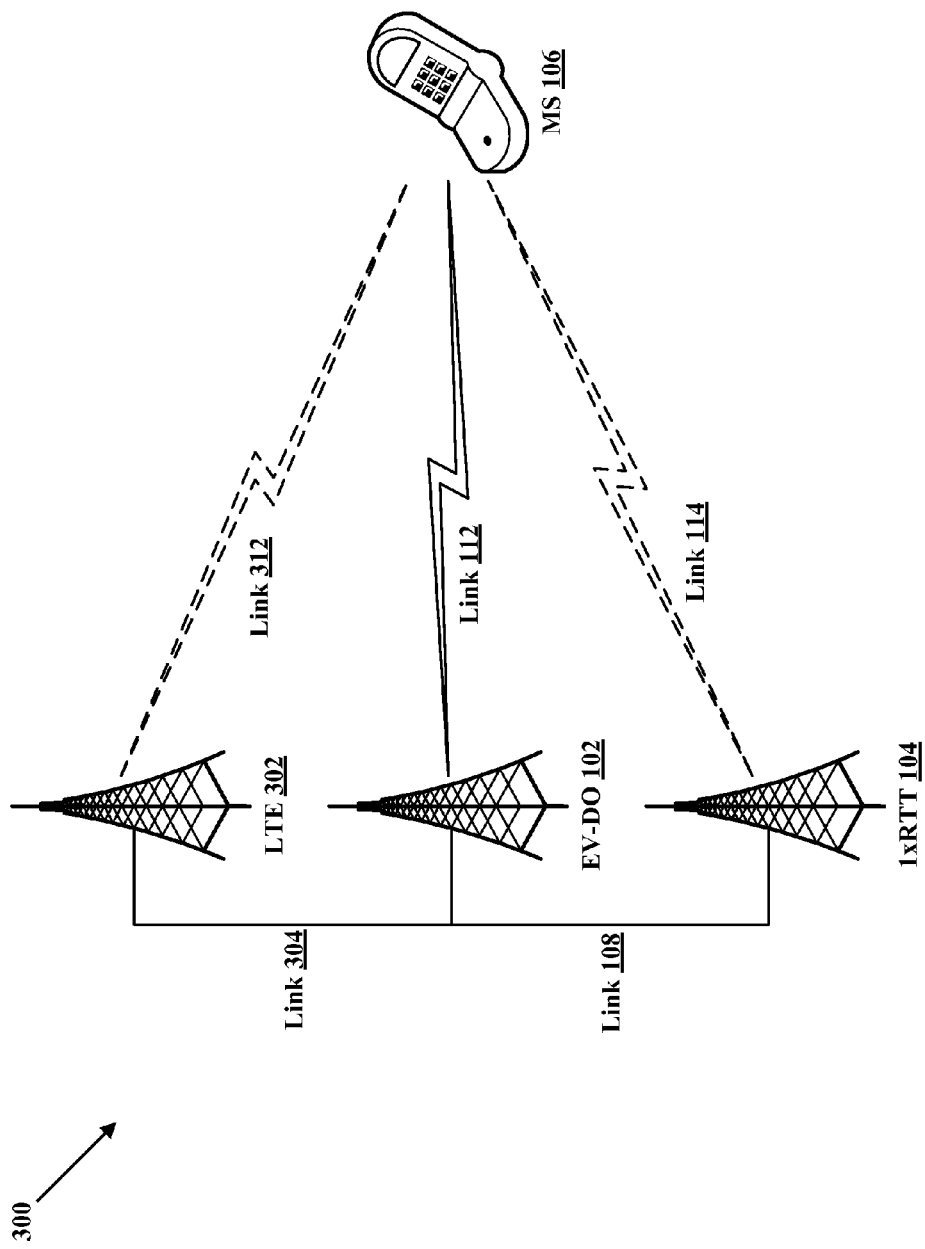
FIG. 3 is a simplified block diagram of a second wireless-communication system in accordance with exemplary embodiments.

FIG. 3 is a simplified block diagram of a second wireless-communication system, in accordance with exemplary embodiments. As shown, wireless-communication system 300 includes first and second network 102, communicatively connected via link 108 as described with reference to FIG. 1. The system further includes initial network 302, which is illustrated in FIG. 3 as an LTE network, communicatively connected to first network 102 via link 304 (and indirectly connected to second network 104 via the first network, perhaps via an IP Multimedia Subsystem (IMS) or any other network entity or interface).

LTE network 302 is shown as including a representative LTE base station known as an eNodeB, which includes an antenna structure and associated equipment for engaging in LTE communication over with one or more User Equipment (UEs) (shown as mobile station 106 in FIG. 3) via a respective air-interface links 312. The eNodeB may be communicatively coupled to a Mobility Management Entity (MME) that serves as a signaling controller for the LTE network. The eNodeB may be further communicatively coupled to a serving gateway (SGW), which in turn may be communicatively coupled to a packet-gateway (PGW) that connects with a packet-switched network (such as the Internet).

IV. Second Exemplary Operation

Figure 4:
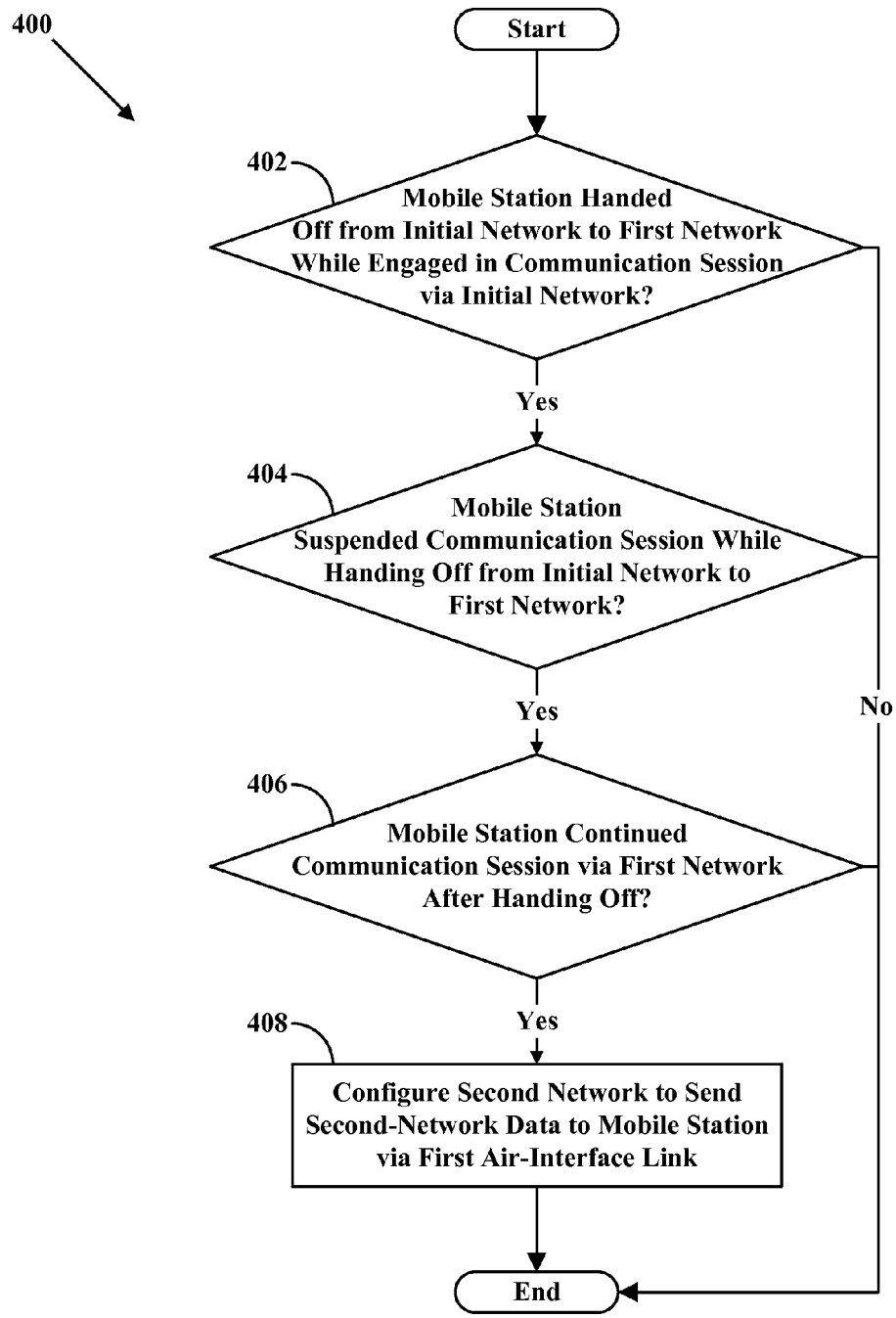
FIG. 4 is a flowchart of a second method in accordance with exemplary embodiments.

FIG. 4 is a flowchart of a second method, in accordance with exemplary embodiments. As shown in FIG. 4, method 400 begins at step 402 with first network 102 determining that mobile station 106 handed off from initial network 302 to first network 102 while engaged in the communication session (e.g., VoIP or VoLTE). In some embodiments, the initial network 302 is an LTE network and the first network 102 is an EV-DO network; however, those having skill in the art will recognize that network 102 and 302 may take other forms as well (such as Wi-Fi or GSM networks, among many other possibilities).

Handing off from initial network 302 to first network 102 could include mobile station 106 terminating an air-interface link with the initial network and establishing an air-interface link with the first network. For example, with reference to FIG. 3, mobile station 106 terminates air-interface link 312 with LTE network 302, and further establishes air-interface link 112 with EV-DO network 102. The mobile station may terminate link 312 before establishing link 112, or depending on the configuration of the mobile station, may establish the air-interface link 112 with EV-DO network 102 before terminating the air-interface link 312 with LTE network 302. Those having skill in the art will recognize, however, that the hand off could take other forms as well without departing from the scope of the claims.

In an embodiment, the type of communication session could be classified using an LTE quality-of-service class identifier (QCI). Upon mobile station handing off from LTE network 302 to EV-DO network 102, the mobile station and/or the initial network could send a notification to the second network that indicates the QCI value of the communication session. Further, first network 102 may determine that mobile station 106 was initially engaged in the communication session via initial network 302 by, for example, receiving a notification from the initial network indicating as much. The received notification could indicate the type of communication session (e.g., the QCI value).

Method 400 continues at steps 404 and 406 with first network 102 respectively determining that mobile station 106 (i) suspended the communication session while handing off from initial network 302 to first network 102, and (ii) continued the communication session via the first network after handing off from the initial network. Method 400 then continues at step 408 with first network 102, in response to determining that mobile station 106 continued the communication session with first network 102, configuring second network 104 to send second-network data to mobile station 106 via an inter-network communication interface. Configuring second network 104 is described above in detail with reference to method step 204.

V. Exemplary Wireless-Communication-System Entity

Figure 5:
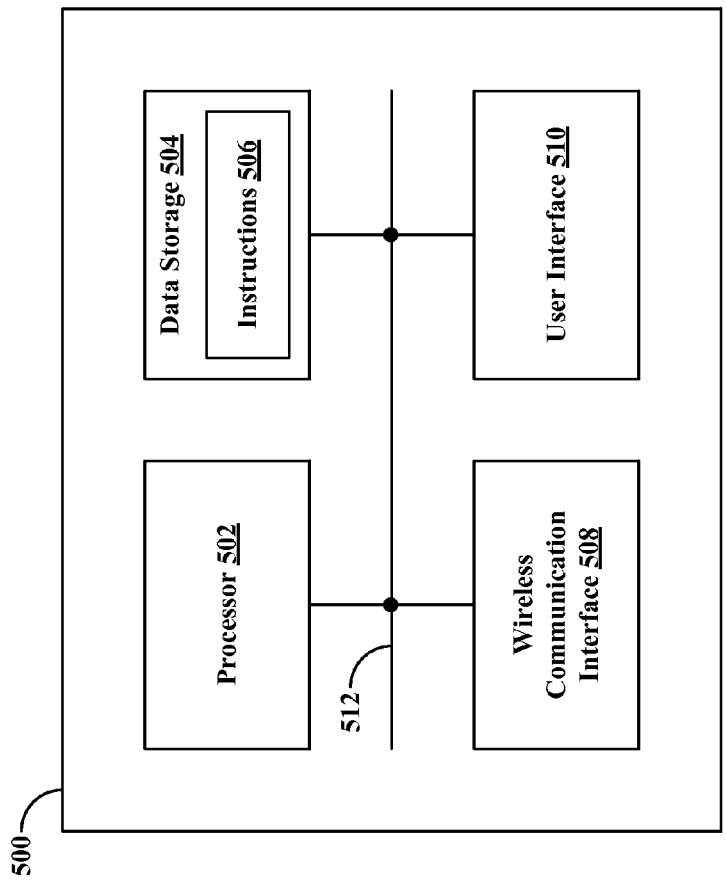
FIG. 5 is a simplified block diagram of a wireless-communication-system entity in accordance with exemplary embodiments.

FIG. 5 is a simplified block diagram of a wireless-communication-system entity in accordance with exemplary embodiments. As shown in FIG. 5, entity 500 includes a processor 502, a non-transitory data storage 504 storing instructions 506, a wireless communication interface 508, and a user interface 510, each of which are communicatively linked together by a system bus, network, or other connection mechanism 512. Entity 500 could include additional and/or different components as well; for example, an entity such as a base station may not require or provide a user interface. In operation, the entity is configured to communicate with mobile station 106, any of networks 102, 104, or 302, or any entity in these or other networks within wireless-communication systems 100 or 300 (as well as any combination of these).

Processor 502 may take the form of one or more general purpose processors (e.g., microprocessors) and/or one or more special purpose processors (e.g., application specific integrated circuits), and may be integrated in whole or in part with data storage 504, wireless communication interface 508, and or user interface 510. And data storage 504 may include one or more volatile and/or non-volatile storage components, such as optical, magnetic, or flash memory. The data storage may comprise program instructions 506, which may be executable by processor 502 to carry out various network-entity functions described herein.

Wireless communication interface 508 may include an antenna structure and associated components (e.g., a mobile-station-modem chipset) for engaging in wireless communication with mobile station 106 or networks 102, 104, or 302 (or any combination of these). As such, the wireless communication interface may take the form of (or include) one or more integrated circuits that support air-interface communication with both first network 102 (e.g., EV-DO) and second network 104 (e.g., 1xRTT), and perhaps with initial network 302 (e.g., LTE) as well.

User interface 510 could take the form of various input components, such as a touch sensitive surface, a microphone, a camera, and a keypad, for receiving user input, and output components, such as a display screen and a speaker, for providing output to a user. Further, the user interface may include analog-to-digital circuitry for converting between analog input/output exchanged with a user and digital input/output for processing by entity 500. In practice, user interface 510 may support engaging in various communications such as those discussed above.

Exemplary embodiments have been described above. Those skilled in the art will understand, however, that changes and modifications may be made to these embodiments without departing from the true scope and spirit of the invention. Further, no reference to a wireless-communication entity should be understood to refer to a particular an entity operating according to a specific air-interface protocol, unless stated otherwise. For example, it should be understood that, although the described embodiments may refer to a mobile station, the same mobile station could additionally (or alternatively) take the form of an EV-DO access terminal, LTE user equipment, and the like.

We claim:

1. A method comprising:
  making a first determination that a mobile station handed off from a Long Term Evolution (LTE) network to an Enhanced Voice-Data Only (EV-DO) network while engaged in a communication session and that the mobile station continued the communication session via an air-interface link with the EV-DO network after handing off from the LTE network to the EV-DO network; and
  in response to making the first determination, configuring a 1xRTT network to send 1xRTT-network data to the mobile station via an inter-network connection interface between the 1xRTT network and the EV-DO network, for transmission of the 1xRTT-network data to the mobile station via the air-interface link with the EV-DO network rather than via an air-interface link with the 1xRTT network, wherein the 1xRTT-network data comprises a 1xRTT page message.

2. The method of claim 1, wherein the communication session comprises a guaranteed-bit-rate session.

3. The method of claim 1, wherein the communication session comprises a voice communication session.

4. The method of claim 1, wherein determining that the mobile station handed off while engaged in the communication session comprises receiving a notification from the LTE network that the mobile station was initially engaged in the communication session via the LTE network.

5. The method of claim 1, wherein the mobile station handing off from the LTE network to the EV-DO network comprises the mobile station terminating an air-interface link with the LTE network and establishing the air-interface link with the EV-DO network.

6. A wireless-communication-system entity comprising:
  a processor and data storage comprising instructions that, when executed by the processor, cause the entity to:
    make a first determination that a mobile station handed off from a Long Term Evolution (LTE) network to an Enhanced Voice-Data Only (EV-DO) network while engaged in a communication session and that the mobile station continued the communication session via an air-interface link with the EV-DO network after handing off from the LTE network to the EV-DO network; and
    in response to making the first determination, configure a 1xRTT network to send 1xRTT-network data to the mobile station via an inter-network connection interface between the 1xRTT network and the EV-DO network, for transmission of the 1xRTT-network data to the mobile station via the air-interface link with the EV-DO network rather than via an air-interface link with the 1xRTT network, wherein the 1xRTT-network data comprises a 1xRTT page message.

7. The entity of claim 6, wherein the communication session comprises a guaranteed-bit-rate session.

8. The entity of claim 6, wherein the communication session comprises a voice communication session.

* * * * *